(12) United States Patent
   Saperstein

(10) Patent No.: US 8,167,202 B2
(45) Date of Patent: May 1, 2012

(54) METHOD AND APPARATUS FOR LOCATING MOBILE ASSETS

(76) Inventor: Jan R. Saperstein, Marietta, GA (US)

( * ) Notice: Subject to any disclaimer, the term of this patent is extended or adjusted under 35 U.S.C. 154(b) by 457 days.

(21) Appl. No.: 12/434,965

(22) Filed: May 4, 2009

(65) Prior Publication Data

US 2009/0230191 A1    Sep. 17, 2009

Related U.S. Application Data

(63) Continuation-in-part of application No. 11/422,461, filed on Jun. 6, 2006, now Pat. No. 7,717,338, which is a continuation-in-part of application No. 11/369,162, filed on Mar. 7, 2006, now Pat. No. 7,451,927, which is a continuation-in-part of application No. 11/303,791, filed on Dec. 16, 2005, now Pat. No. 7,416,123.

(51) Int. Cl.
   *G06K 7/00*    (2006.01)
(52) U.S. Cl. ........................................ 235/385
(58) Field of Classification Search .................. 235/384, 235/385, 439, 440, 446, 474, 492
   See application file for complete search history.

(56) References Cited

U.S. PATENT DOCUMENTS 7,367,497 B1 *    5/2008    Hill .............................. 235/382.5
2006/0063523 A1 *    3/2006    McFarland ..................... 455/423

* cited by examiner

*Primary Examiner* — Seung Lee
(74) *Attorney, Agent, or Firm* — Bryan W. Bockhop

(57) ABSTRACT

A system for locating mobile assets includes a plurality of fixed mesh network communications devices, an asset-specific location device, and a computer. Each fixed mesh network communications device is associated with a different location within a predefined area. The asset-specific location device is coupled to the mobile assets and communicates an asset-specific identification to a nearest fixed mesh network communications device via a mesh network. The computer is in communication with each of the fixed mesh network communications devices and receives a request for a location of one of the mobile assets; polls each fixed mesh network communications device to determine which one is in communication with a selected asset-specific location device affixed to the selected mobile asset; and identify the location associated with the fixed mesh network communications device in communication with the asset-specific location device.

14 Claims, 13 Drawing Sheets

METHOD AND APPARATUS FOR LOCATING MOBILE ASSETS

CROSS-REFERENCE TO RELATED APPLICATION(S)

This application is a continuation-in-part of, and claims the benefit of, U.S. patent application Ser. No. 11/422,461, filed Jun. 6, 2006, which is a continuation-in-part of U.S. patent application Ser. No. 11/369,162, filed Mar. 7, 2006, now issued as U.S. Pat. No. 7,451,927, which is a continuation-in-part of U.S. patent application Ser. No. 11/303,791, filed Dec. 16, 2005, now issued as U.S. Pat. No. 7,416,123, the entirety each of which is hereby incorporated herein by reference.

BACKGROUND OF THE INVENTION

1. Field of the Invention

The present invention relates to locating systems and, more specifically, to a system of locating a mobile asset within a predefined area.

2. Description of the Prior Art

With increases in global travel and trade, misdirection of transported items causes substantial hardship to those who are transporting such items and substantial cost to those responsible for the transport of such items. When an item cannot be found, insurance providers also bear a cost. For example, airlines misdirect many pieces of luggage each year. Finding lost luggage causes considerable inconvenience to the passengers whose luggage is lost and considerable expense to the airline that misdirected the luggage.

One method of preventing misdirection of luggage includes attaching a bar-coded tag to each piece of luggage as the owner checks in for a flight. The tag is scanned at the point of departure and at the point of arrival (and any intermediate points) and the location of the luggage is stored in a computer database. While such a tracking system has been quite effective in reducing the incidence of lost luggage, luggage still gets misdirected. This can occur for one of several reasons, including airline ticketing counter attendant error resulting in an incorrect tag being applied to a piece of luggage. Also, a tag can be inadvertently removed from a piece of luggage during the handling process.

This problem is also significant in other areas. For example, international freight transport typically involves sending containers on container ships. The containers often include exterior bar-coded labels used for tracking purposes. However, containers can be misdirected through operator error. When a container is misdirected, the cost of failing to locate it quickly can be substantial.

Certain existing and proposed location systems include devices that apply a radio transponder, such as an RFID tag, to the item being transported. When an item is lost, a message is sent to each transportation node where the item could be sent and an operator with a corresponding radio frequency device searches through the node seeking a return signal indicating the presence of the lost item. Such systems have the disadvantage of requiring a considerable amount of time to be spent by personnel at each node, including all of the nodes to which the item was not spent.

Recently, that has been an increasing need for improved security relating to luggage and containers being imported. One method of ensuring security is to check each item in a cargo hold against a shipping manifest, thereby ensuring that exactly the items to be transported are in the cargo hold. However, such checking can be time consuming and not practical when, as with a scheduled flight, delays may cause scheduling problems and economic loss to the carrier.

Also, many people are concerned with increased smuggling of contraband (such as narcotics weapons materials). However, with most cargo operations, inspecting each container entering a port is quite difficult. Contraband sensor systems disposed in containers have not been effective because the containers that are placed under layers of other containers are usually shielded from central communication servers, thereby preventing a communication link between the most remote containers and the central server.

There are many types of mobile assets, such as wheel chairs at an airport, shopping carts at a store, rental bicycles or short use rental cars, etc. Such mobile assets may be used by many different people at different times. Often a person uses a mobile asset and then leaves it at a random location. For example, many cities have short use—one way car rental agencies, in which a vehicle is picked up by a user in one location in the city and left at another location. Efficient use of such mobile assets requires that the assets can be easily located. Current location systems involve manual reporting of the asset locations, which is time consuming and unreliable.

Therefore, there is a need for a system that facilitates automatic location of mobile assets.

SUMMARY OF THE INVENTION

The disadvantages of the prior art are overcome by the present invention which, in one aspect, is an apparatus for identifying items in a cargo hold, having an entrance that is accessible by a user, wherein each of the items includes an individual mesh network communication device and wherein each individual mesh network communication device including a memory that stores a unique item identification. The apparatus includes a primary mesh network communications device and a portable computational device in data communication with the primary mesh network communication device. A frame separates the primary mesh network communications device from the portable computational device at a distance that enables the user to hold the portable computational device and to direct the mesh network communications device to the entrance of the cargo hold.

In another aspect, the invention is a shipping container that includes a plurality of walls, in which each wall has an interior surface and an exterior surface. A container mesh network communication device is affixed to the interior surface of a selected wall of the plurality of walls. An antenna is in communication with the container mesh network communication device and is affixed to the exterior surface of the selected wall.

In another aspect, the invention is a system for monitoring a shipping container that includes a sensor array disposed within the container. The sensor array is configured to detect at least one environmental parameter within the shipping container and to generate an indication of the environmental parameter. A container mesh network communication device is in communication with the sensor array and is responsive to the indication of the environmental parameter. The container mesh network communication device is configured to store a unique container identification. A container polling unit is in wireless communication with the container mesh network communication device and is configured to poll the container mesh network communication device and to receive therefrom the indication of the environmental parameter and the unique container identification. The container polling unit is also configured to generate an indication signal corresponding to the environmental parameter. A communication device is in communication with the container polling unit and transmits the indication signal to a remote receiver.

In another aspect, the invention is a method of verifying a cargo manifest for a cargo hold in which a plurality of items are disposed in the cargo hold and in which each of the plurality of items has an individual mesh network communication device associated therewith and in which each individual mesh network communication device stores a unique item identification. In the method, the cargo manifest, including a unique manifest identification corresponding to each item on the cargo manifest, is downloaded to a portable computing device. A polling signal is transmitted using a primary mesh network communication device that is controlled by the portable computing device. The corresponding unique item identification is received from each individual mesh network communication device and each unique item identification in an item list is stored. Each unique item identification received is compared to each unique manifest identification. An indication of each mismatch between the cargo manifest and the item list. is generated.

In another aspect, the invention is a method of monitoring a cargo container on a carrier, in which a polling request message is transmitted to a container mesh network communications device associated with the container. Container-specific information is received from the container mesh network communications device in response to the polling request. A polling signal is received from a remote requester, in which the polling signal includes a carrier identification. The carrier identification is compared to a stored identification and, if the carrier identification is identical to the stored identification, then the container-specific information is transmitted to the remote requester.

In another aspect, the invention is a system for locating mobile assets within a predefined area that includes a plurality of fixed mesh network communications devices, an asset-specific location device, and a computer. Each of the plurality of fixed mesh network communications devices is associated with a different predetermined location within the predefined area. The asset-specific location device is coupled to at least one of the mobile assets and is configured to communicate an asset-specific identification to a nearest one of the plurality of fixed mesh network communications devices via a mesh network. The computer is in communication with each of the fixed mesh network communications devices and is configured to: receive from a user a request for a location of a selected one of the mobile assets; poll each of the plurality of fixed mesh network communications devices to determine which one of the plurality of fixed mesh network communications devices is in communication with a selected asset-specific location device that is affixed to the selected one of the mobile assets; and identify to the user the predetermined location associated with the fixed mesh network communications device that is in communication with the selected asset-specific location device.

In another aspect, the invention is a system for locating mobile assets within an airport. A plurality of fixed mesh network communications devices is disposed in a different area of the airport. A wheel chair is coupled to a wheel chair-specific location device. The wheel chair-specific location device is configured to communicate a wheel chair-specific identification to a nearest one of the plurality of fixed mesh network communications devices via a mesh network. Each wheel chair-specific location device includes a power source, a mesh network communication device electrically coupled to the power source, a memory circuit that stores the wheel chair-specific identification and a processor. The processor is electrically coupled to the power source and is in communication with the memory circuit and the mesh network communication device. The processor is programmed to execute the following steps: if a wheel chair identification message is received from the fixed mesh network communication device, then compare a wheel chair identification included in the wheel chair identification message to the wheel chair-specific identification stored in the memory; and when the wheel chair identification included in the wheel chair identification message corresponds to the wheel chair-specific identification stored in the memory, then transmit a wheel chair found message to the fixed mesh network communication device. A computer, in communication with each of the fixed mesh network communications devices is configured to: receive from a user a request for a location of a selected wheel chair; poll each of the plurality of fixed mesh network communications devices to determine which of the plurality of fixed mesh network communications devices is in communication with a selected wheel chair-specific location device that is in affixed to the selected one of the wheel chairs; and identify to the user the predetermined location associated with the fixed mesh network communications device that is in communication with the selected wheel chair-specific location device.

In yet another aspect, the invention is a method of locating mobile assets within a predefined area, in which an asset identification is transmitted from a central station to a plurality of fixed mesh network communications devices associated with a different predetermined location within the predefined area. The asset identification is transmitted from each fixed mesh network communications device. A response is received at one fixed mesh network communication device from at least one asset-specific location device affixed to at least one of the mobile assets. The response indicates that the at least one asset-specific location device has stored therein the asset identification. An indication that the one fixed mesh network communication device has received the asset identification from the at least one asset-specific location device is transmitted from the one fixed mesh network communication device to the central station.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 20 is a schematic diagram of a mobile asset location system adapted for use with shopping carts and the like.

DETAILED DESCRIPTION OF THE INVENTION

Figure 1:
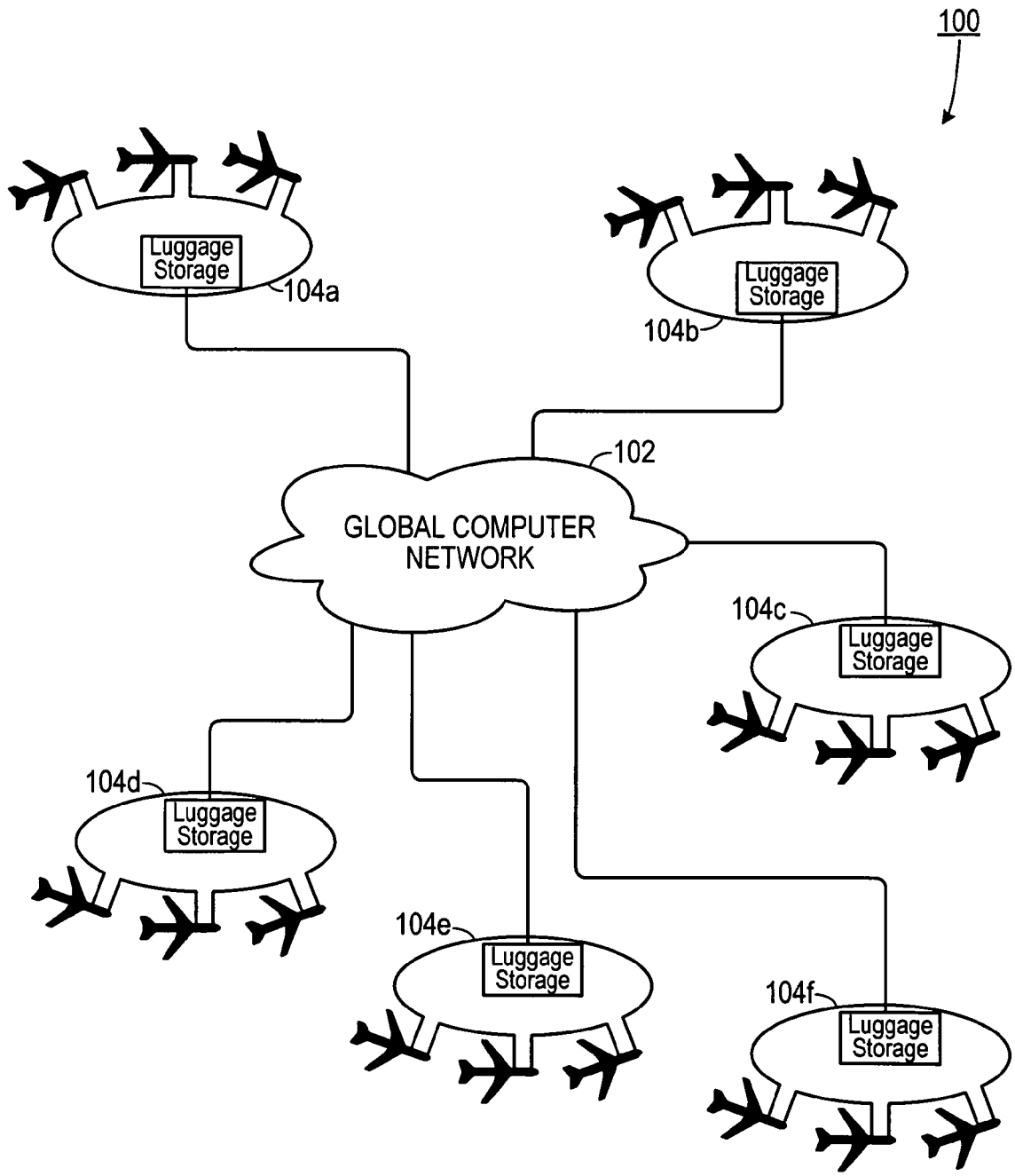
FIG. 1 is a schematic diagram of a system according to one illustrative embodiment of the invention.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in"and "on." Also, as used herein, "global computer network" includes the Internet.

As shown in FIG. 1, one illustrative embodiment of the invention is a system 100 for locating lost items, such as luggage. In the system 100, a plurality of different transportation nodes 104a-f (such as airports, train stations, shipping terminals, etc.) communicate with each other via a global computer network 102. In one illustrative embodiment of the invention employed in aviation, when a traveler arrives at an airport (e.g., airport 104d) and notices that a piece of luggage is missing, he can go to a lost luggage representative for the airline on which he traveled to report the missing luggage. The lost luggage representative sends a message to all of the other airports in the system 100 identifying the lost piece of luggage. A search for the lost piece of luggage is performed at each airport using the system described below. If the piece of lost luggage is found at an airport (e.g., airport 104b) then a signal is sent from a computer at the airport 104b to the destination airport 104d indicating that the piece of luggage has been found and identifying the airport at which it has been found.

Figure 2A:
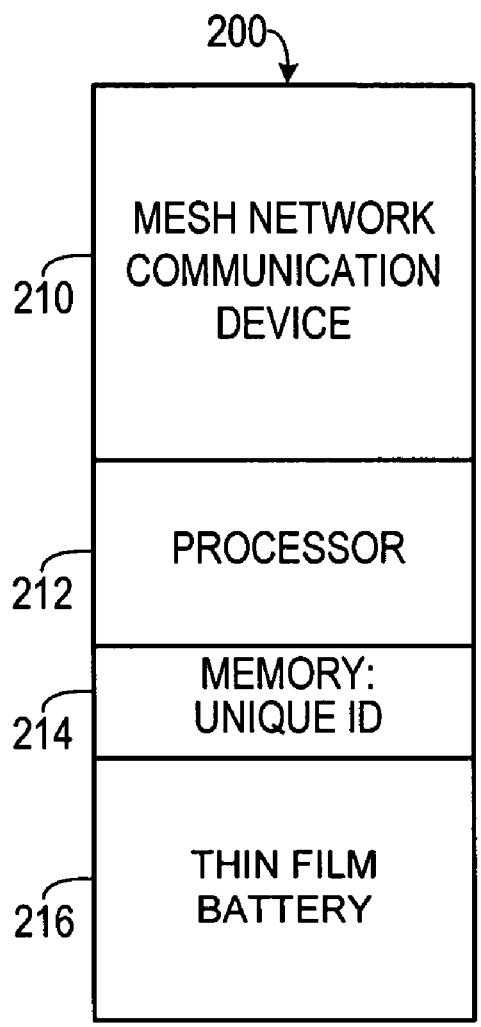
FIG. 2A is a block diagram of one embodiment of a mesh network location device.

A device 200 used in identifying luggage is shown in FIG. 2A. Each piece of luggage that employs the system would include one of these devices 200 disposed therein. The device 200 includes a mesh network communication device 210 that is powered by a power source 216. A processor 212 is also powered by the power source 216 and is in data communication with a memory 214 and the mesh network communication device 210. The processor 212 could be a standard on-board microprocessor or microcontroller. The memory stores, inter alia, a unique identification. The unique identification could take the form of a sequence of bits that uniquely identify a specific device 200 with respect to all other similar devices in the system.

The power source 216 could include a battery (such as the thin film battery shown) or another type of power source, such as a micro fuel cell, a super capacitors, etc. One source of suitable thin-film batteries is Excellatron Solid State LLC, 263 Decatur Street, Atlanta, Ga. 30312.

In one exemplary embodiment, any one of several commercially-available ZigBee®devices may be used for the mesh network communication device 210. ZigBee® is a published specification set of high level communication protocols designed to use small, low power digital radios based on the IEEE 802.15.4 standard for wireless personal area networks. In one embodiment, the device 210 employs the 802.14.5—IEEE MAC Layer as the radio specification for communications and uses the ZigBee® protocol (firmware stack) to govern the utilization of the radio. In one example, the device 210 operates in the 2.4 GHz band but could also have the capability to operate in 868 MHz as well as the 900 MHz bands. Typically, 868 MHZ has been designated for European operations, whereas 900 MHz has been authorized for operation in North America. Currently, 2.4 GHz is accepted world-wide as an acceptable frequency. In one illustrative mode, the device 210 will communicate in a STAR and Peer-to-Peer network topology. Such networks, sometimes referred to as "mesh networks" or "ad-hoc networks" are self-discovering, self-forming and self-healing.

Figure 2B:
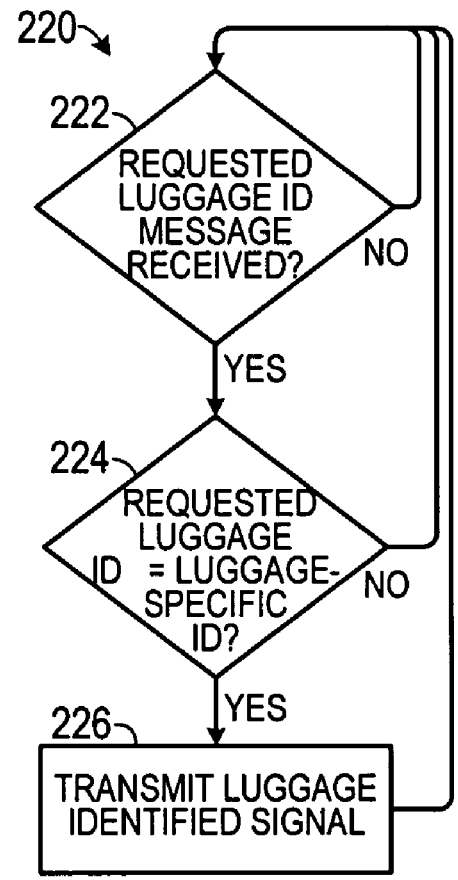
FIG. 2B is a flow diagram of one representative method that may be employed in the mesh network location device shown in FIG. 2A

The processor 212 is programmed to execute several steps, as shown in the flow chart 220 shown in FIG. 2B. Initially, the system waits until an item identification message is received 222 from the fixed mesh network communication device. Then the processor 212 compares 224 the unique item identification to the unique item-specific identification. If the unique item identification corresponds to the unique item-specific identification, then the system transmits 226 the item identified message via the mesh network communication device 210.

Figure 3:
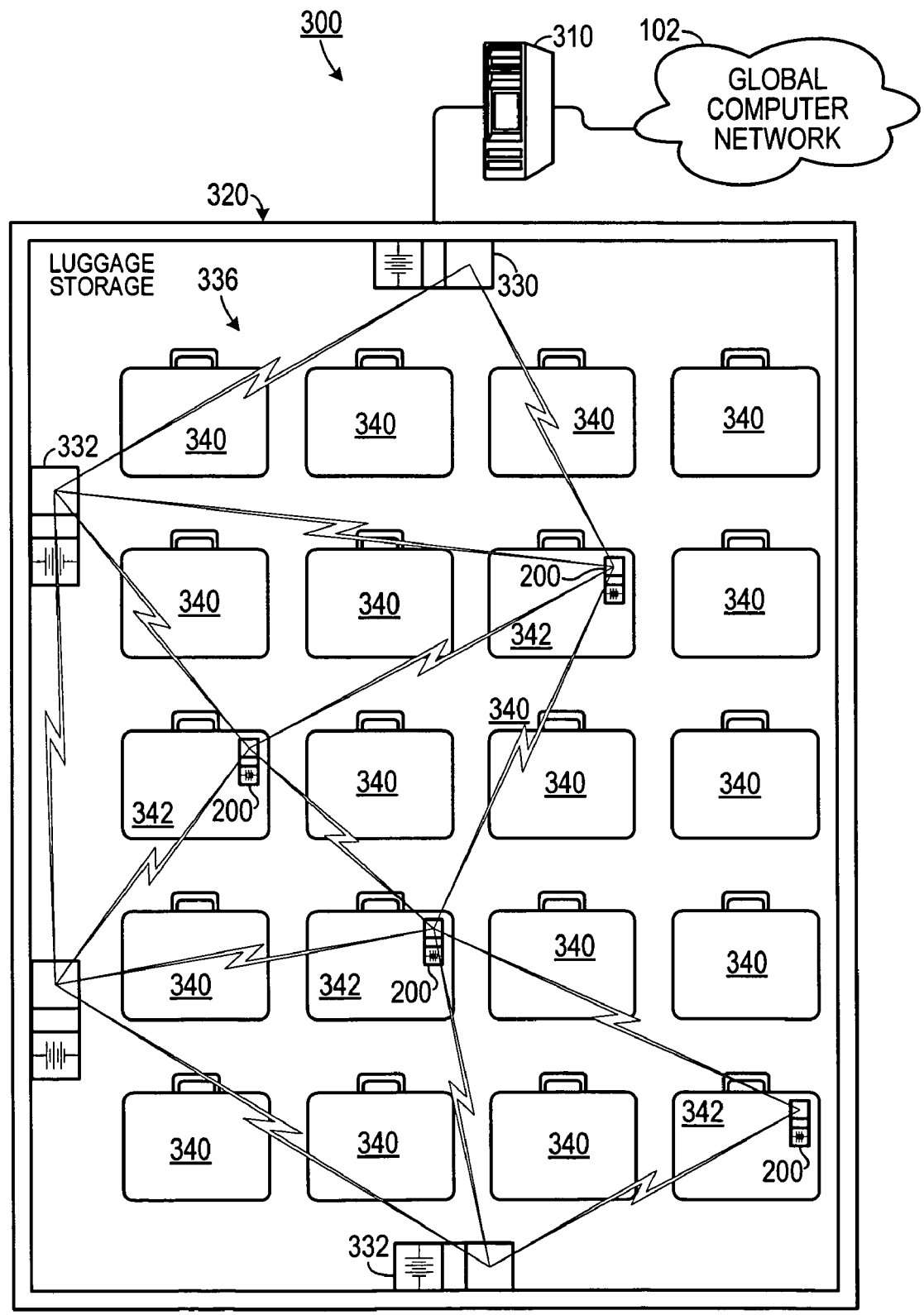
FIG. 3 is a schematic diagram of one embodiment of the invention being employed in a luggage storage room.

Typically, as shown in FIG. 3, lost luggage is stored in a luggage storage area 320 at an airport. A system 300 used to find lost luggage, according to one illustrative embodiment of the invention, could include a computer 310 in communication with the global computer network 102 and a fixed mesh network communications device 330 that is disposed in the luggage storage area 320. Several other fixed mesh network communications devices 332 may also be located in the luggage storage area 320, to serve as passive relays. While some pieces of luggage 340 may not participate in the luggage location system, pieces of luggage 342 that do would have item-specific location device 200 disposed therein.

Each of the fixed mesh network communications devices 330 and 332 and the item-specific location devices 200 are able to communicate with each other and can form an ad-hoc mesh network 336 when they are within range of each other. When the computer receives an item identification message from the global computer network 102, it transmits an item identification message to fixed mesh network communications device 330. The item identification message will include a unique identification of a piece of luggage that has been lost and that is sought by the requester. The fixed mesh network communications device 330 then transmits an item identification message (including the unique identification of the piece of lost luggage being sought) to the item-specific location devices 200 and fixed mesh network communications devices 332 within range. Each item-specific location device 200 and fixed mesh network communications device 332 retransmits the item identification message to surrounding item-specific location devices 200 and fixed mesh network communications devices 332. Also, each of the item-specific location devices 200 compares the identification of the piece of lost luggage being sought to the unique identification stored in its memory. If one of the item-specific location devices 200 has stored therein the identification of the piece of lost luggage being sought, it sends a luggage identified message to the computer via the mesh network 336. The computer 310 then sends to the requester via the global computer network 102 a message indicating that the piece of luggage has been found and an indication of which airport it has been found at.

Once it is determined that the piece of lost luggage is in a specific luggage storage area 320 at an airport, the specific location of the piece of luggage within the luggage storage area 320 may then be determined by one of several methods. In one simple method, an operator can move throughout the luggage storage area 320 looking for a piece of luggage that matches the description of the lost piece of luggage. Also, a hand-held mesh network communications device can be moved throughout the luggage storage area 320 continually sending out queries for the lost piece of luggage. If the hand-held device is equipped with a signal strength indicator, then the operator would move through luggage storage area 320 until maximum received signal strength is detected.

Figure 4:
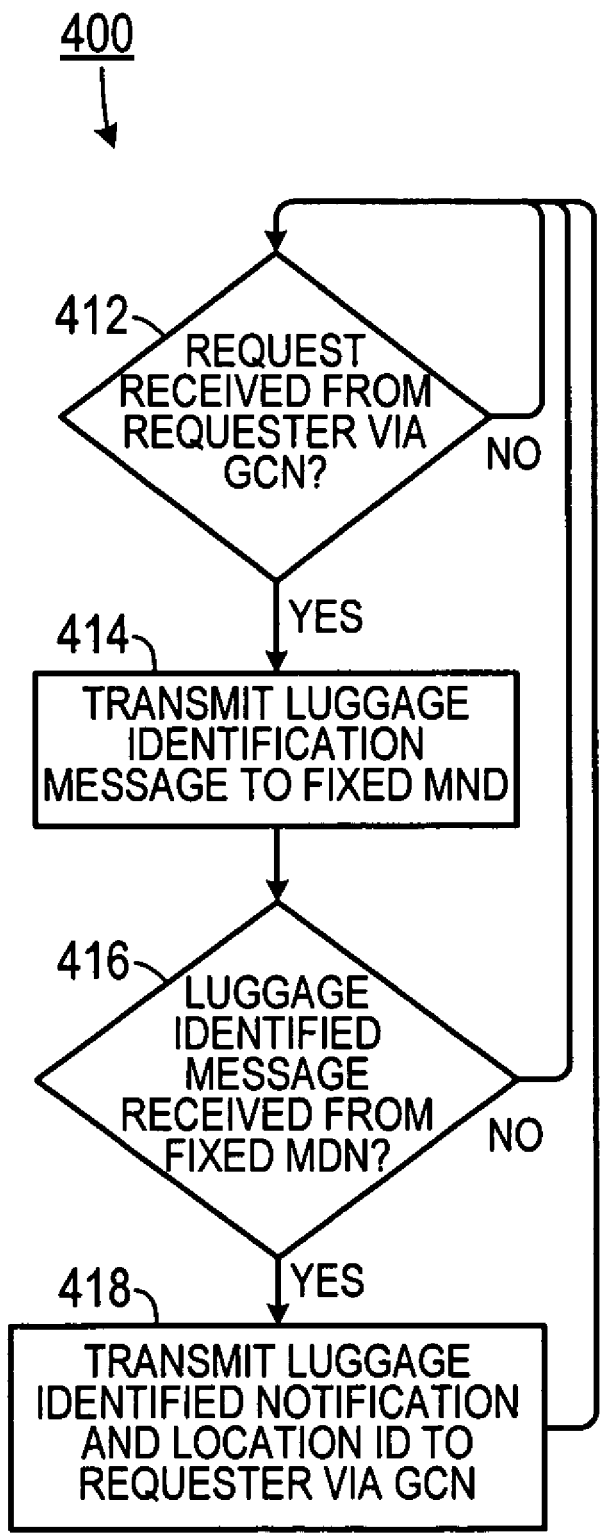
FIG. 4 is a flow diagram of a method that may be employed in a computer at a node.
Figure 5:
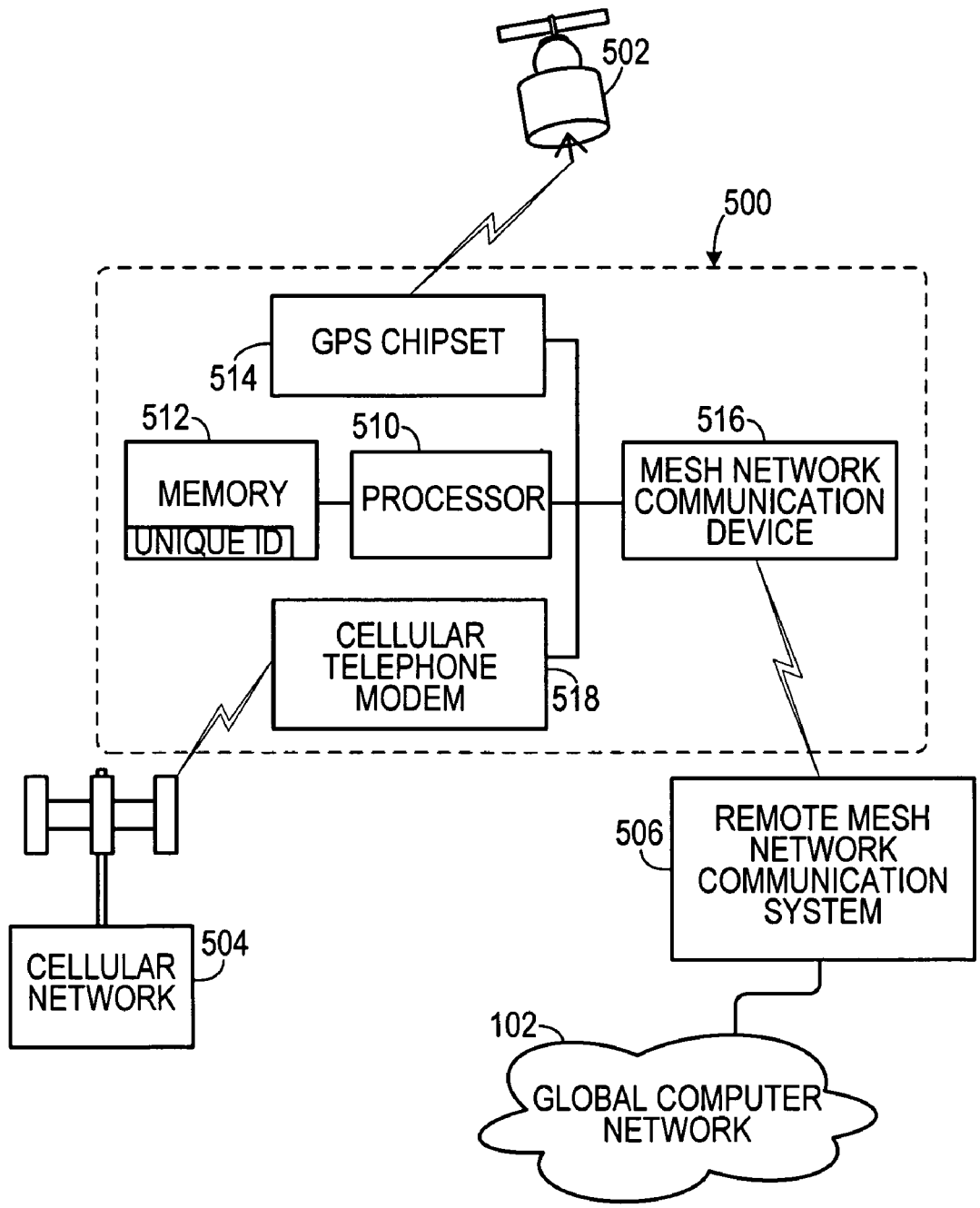
FIG. 5 is a schematic diagram of one embodiment of the invention interacting with a global positioning satellite and a wireless communications system.

As shown in FIG. 4, in one illustrative embodiment, the computer 310 may be programmed to determine 421 if a luggage identification request has been received from a requester via the global computer network (GCN). Once a luggage identification request has been received, then the computer sends 414a luggage identification message to the fixed mesh network communication device (Fixed MND). If a luggage identified message is received 416 from the fixed mesh network communication device in response to the luggage identification message indicating that the luggage-specific location device corresponds to the requested luggage identification, then the computer transmits 418 to the requester, via the global computer network, a luggage identified notification and a location identification that identifies the transportation node.

One embodiment is an item location apparatus 500 that includes a mesh network communication device 516, a global positioning satellite chipset 514 that can receive location data from a global positioning satellite system 502, a cellular telecommunications modem 518 that can communicate with a wireless network 504, and a digital memory 512 that stores a unique identification. The mesh network communication device 516 is capable of communicating with a remote mesh network communication system 506 that is in communication with a global computer network 102. A processor 510 is in digital communication with the mesh network communication device 516, the global positioning satellite chipset 514, the cellular telecommunications modem 518 and the memory 512. All of these elements could be powered by a power source such as a thin film battery.

Figure 6:
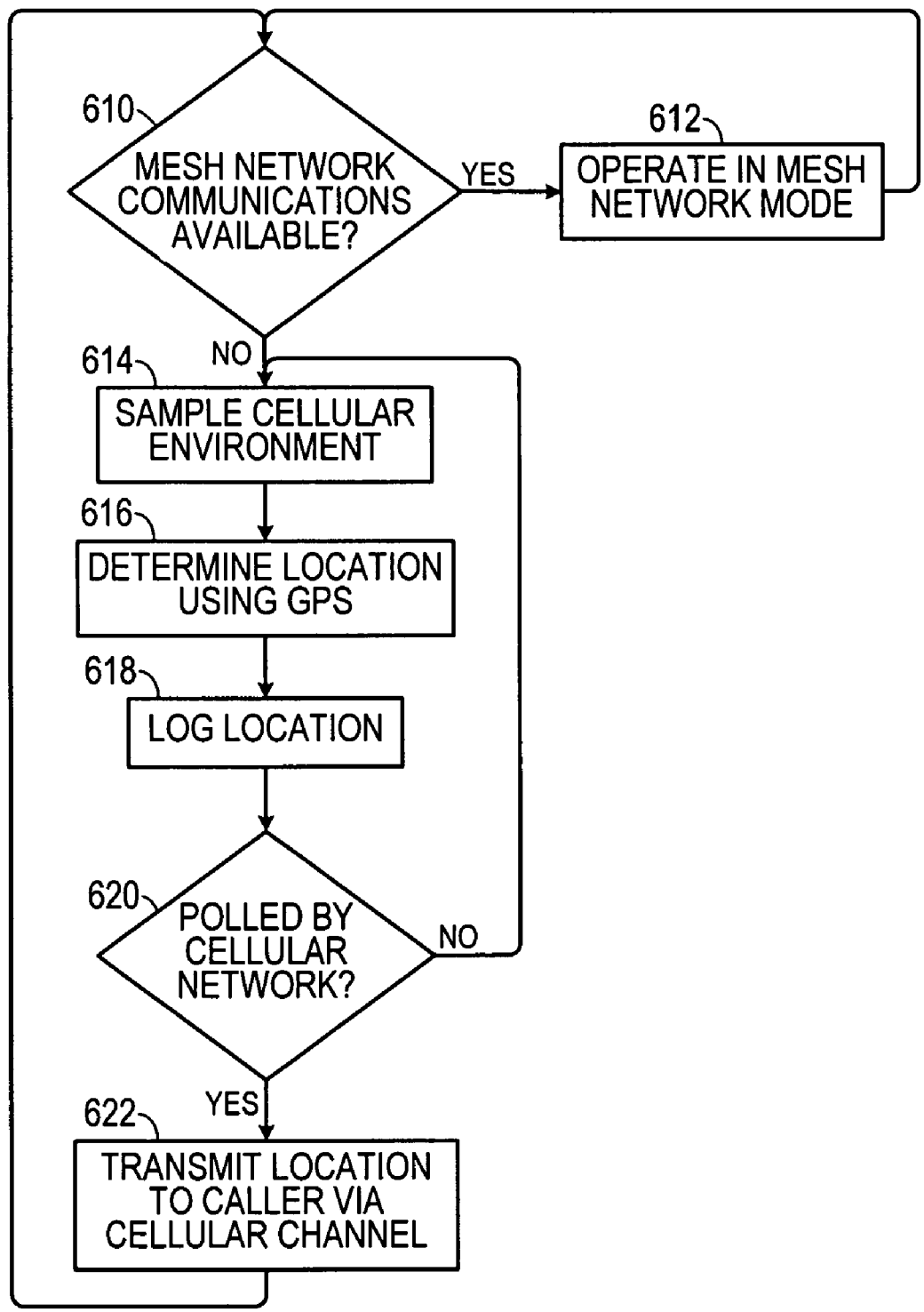
FIG. 6 is a simplified flow diagram of a method that may be employed in a mode of operation that interacts with a global positioning satellite and a wireless communications system.

As shown in FIG. 6, in operation, the system first determines 610 if a mesh network is within range and, if the result is "yes" then the system will operate in a mesh network mode 612, in which the system communicates with the mesh network. If the result is "no," then the system will sample the local cellular environment 614 to determine if it can communicate with a local wireless communications cell. The system also determines its current location 616 based on an input from the GPS chipset and it logs the current location 618 in the digital memory. By logging the location, the system can communicate the last known location in the situation when the system is outside of communication range of all GPS satellites.

The system determines if it is being polled by a cellular network 620 and, if not, it will return to step 614. If the system is being polled, by a requester requesting the location of the object identified by the unique identification, then it will transmit 622 the location of the object and the unique identification to the requester.

Figure 7:
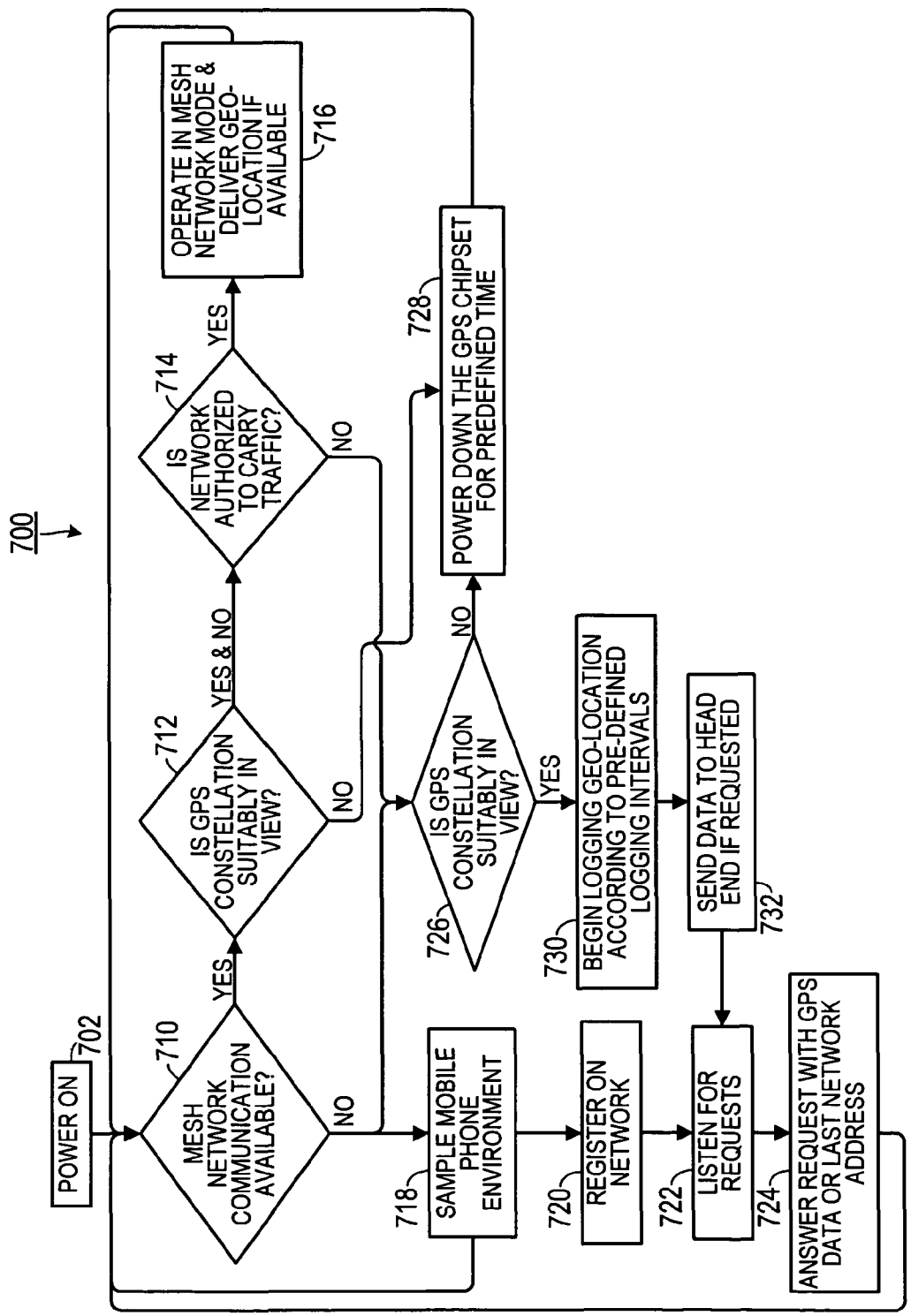
FIG. 7 is a detailed flow diagram of one embodiment of a method that may be employed with the invention.

In another embodiment of the method 700 employed by the system, as shown in FIG. 7, when the system powers on 702 it starts a cycle in which it determines 710 if a mesh network is available. If one is available, it determines 712 whether a GPS constellation is suitably in view to allow location of the object with the GPS chipset. If no GPS constellation is in view, then the system will power down the GPS chipset for a predetermined period of time 728, to reduce drain on the battery, and return to step 710. Also, irrespective of the result of step 712 the system will determine whether it is authorized to communicate with the local mesh network 714. If the system is authorized then it will operate in a mesh network mode 716 in which it will communicate with the mesh network. It will also provide GPS location data for the object if such data is available. If the result of either step 710 or step 714 is "no,"then the system will determine if a GPS constellation is suitably in view 726 and, if the result is "no," the system will go to step 728. Otherwise, the system will begin logging the geographic location of the object 730 and will continue to log the current location periodically. If requested, the system will send location data to a head end 732 or other authorized requester transmitting a request for a location of the object.

If the result of step 710 is that no mesh network is available, then the system will periodically sample 718 the cellular telephone environment to search for a mobile telephone cell within range that the system is authorized to communicate with. Once such a cell is found, the system will register with the cell network 720 and listen 722 for any requests for a location of the object received from the network. The system will then respond to any such requests 724 for a location of the object by transmitting the GPS location data (or the last known location that was logged into the memory if no GPS satellite is in view).

While the disclosed embodiment discusses use of the invention in a system for locating lost luggage at airports (or other types of transportation nodes, such as train stations, bus stations, etc.) the invention could be used in many other applications. For example, the invention could be used for locating lost shipping containers, lost notebook computers, lost pets, etc. It could also be used as part of a supply chain management system to track lost orders and even for performing inventory functions. For example, a company could perform remote inventories of its warehouses using the invention. The invention could also be used in vehicle fleet management systems, allowing a fleet manager to inventory the location of each of its vehicles remotely. As can be seen, given that some mesh network devices are relatively inexpensive, the invention can be used in many applications and it is intended that the claims below apply to all such applications.

Figure 8:
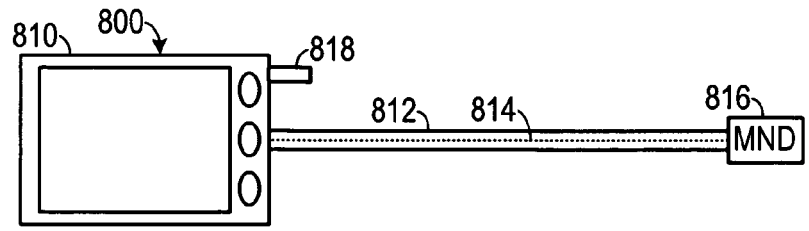
FIG. 8 is a schematic diagram of an embodiment used to detect the presence of items in a cargo hold.

In one embodiment of the invention, a device may be employed to sense the presence of luggage and other items employing a mesh network communication device of the type described above. As shown in FIG. 8, the device 800 could include a personal data assistant 810, or other portable computer, that is spaced apart from a mesh network communication device 816 with a tube 812, or other type of rigid frame structure. A data channel 814 (such as a pair of wires) connects the personal data assistant 810 to the mesh network communication device 816 and can run through the center of the tube 812.

Figure 9A:
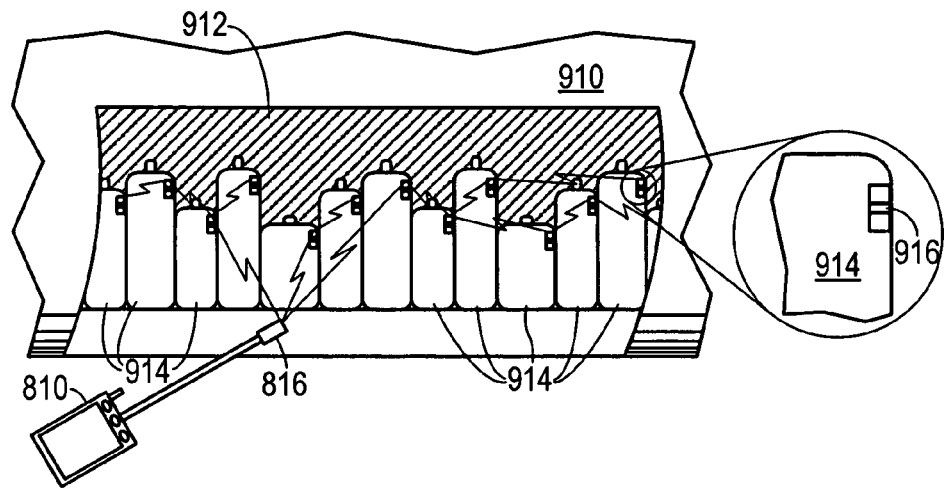
FIG. 9A is a diagram showing use of the embodiment shown in FIG. 8.

In use, as shown in FIG. 9A, the mesh network communication device 816 is placed near an entrance to a cargo hold 912 such as in a airplane 910 and the mesh network communication device 816 will establish a communications tunnel with at least one of the mesh network communication devices 916 and, thereby, set up an ad-hoc network with the mesh network communication devices 916 associated with each piece of luggage 914 inside the cargo hold 912. The mesh network communication devices 916 associated with each piece of luggage 914 could either be placed inside the corresponding piece of luggage 914 or be affixed to its exterior.

Figure 9B:
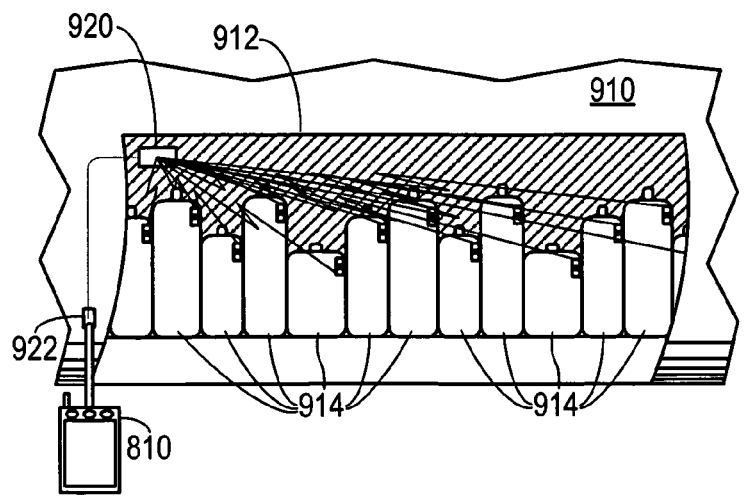
FIG. 9B is a diagram showing an alternative use of the embodiment shown in FIG. 8.
Figure 10:
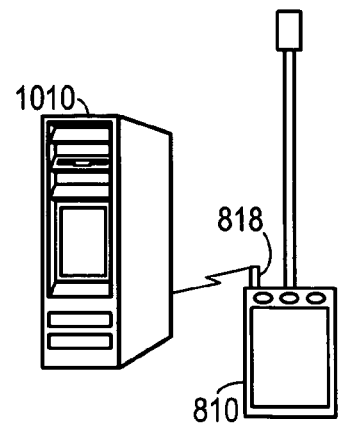
FIG. 10 is a diagram showing communication between the embodiment shown in FIG. 8 and a computer server.

Not only can this embodiment be used to find lost luggage, but it can also be used to verify quickly that all luggage 914 in the cargo hold 912 is listed on the manifest for a flight, and that all luggage 914 on the manifest is in the cargo hold 912. In an alternate embodiment, as shown in FIG. 9B, the cargo hold can be fitted with a fixed mesh network communication device 920 that is hard wired to a communication port 922 that facilitates communication with the personal data assistant 810. The communication port 922 could be one of many, such as a "one-wire" data port (e.g., an "I-Button" data port available from Dallas Semiconductor). As shown in FIG. 10, the manifest may be downloaded from a server 1010 to the personal data assistant 810 through use of a wireless communication port 818 coupled to the personal data assistant 810.

Figure 11:
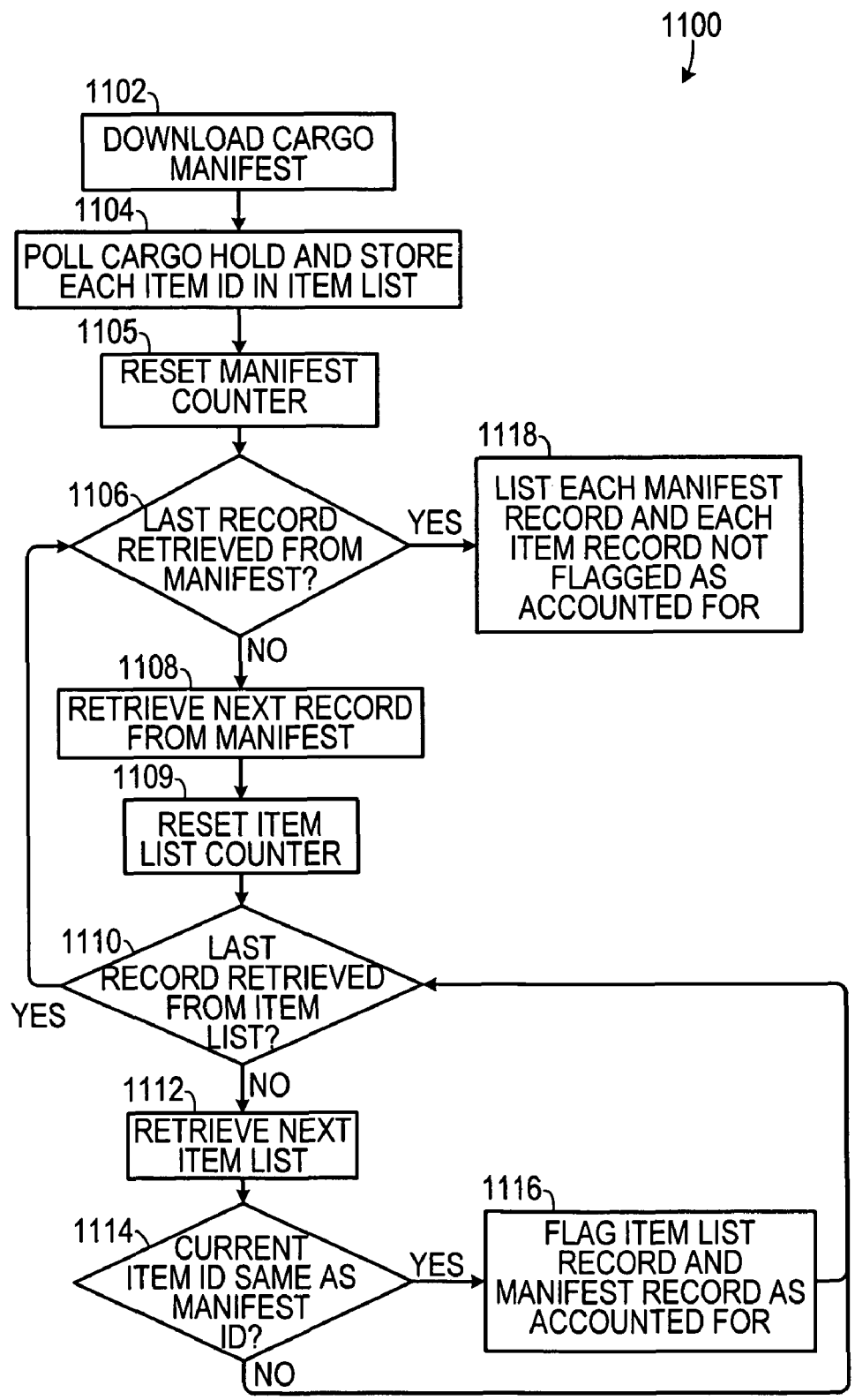
FIG. 11 is a flowchart showing one method for comparing the contents of a manifest to the items in a cargo hold.

As shown in FIG. 11, one method of checking a manifest includes first downloading the cargo manifest 1102 into the memory of the personal data assistant 810, and then polling the cargo hold 1104. In the polling step, a message is sent to at least one of the mesh network communication devices within the cargo hold, thereby setting up an ad hoc network between all of the mesh network communication devices within the cargo hold. Each item, once contacted, transmits its unique item identification to the personal data assistant 810 and each unique item identification is then stored in an item list. The item list is then compared to the manifest. First, a counter for tracking retrieval of manifest records is reset 1105 and then a test 1106 determines if the last record has been retrieved from the manifest. If not, then the next record is retrieved 1108 from the manifest and a counter that tracks retrieval of records on the item list is reset 1109. A test 1110 then determines if the last record has been retrieved from the item list. If not, then the next item is retrieved 1112 from the item list and the currently retrieved item is compared 1114 to the current item from the manifest and if they are the same, both the current item list item record and the current manifest item record are flagged 1116 to indicate that they are accounted for. Otherwise, control passes back to step 1110. Once every item in the item list has been compared, control passes to step 1106 to retrieve the next item on the manifest list. Once all items have been compared, then a list is generated 1118 in which each item on either the item list or the manifest list that is not pared with a corresponding item on the other list is listed. This list indicates either missing luggage or the presence of luggage not belonging to a passenger and can be used to prompt an investigation into the reason for the differing lists.

Figure 12:
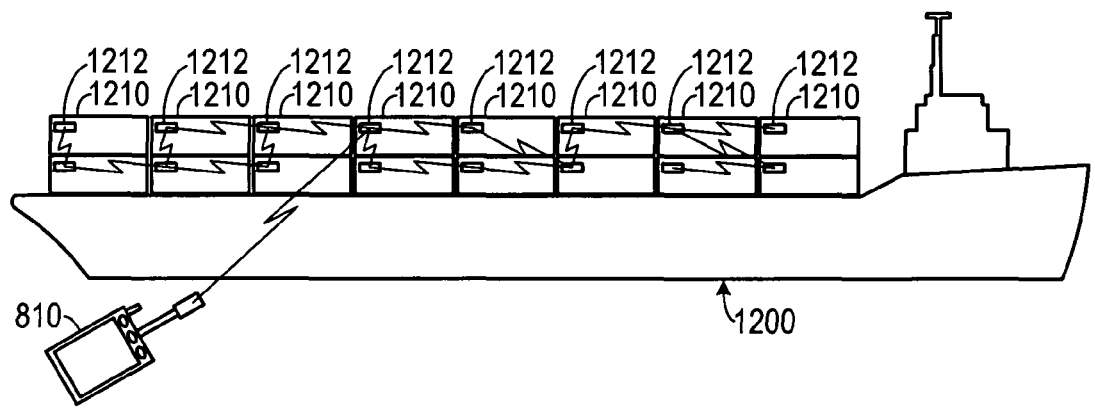
FIG. 12 is a plan view of one embodiment being employed in a cargo ship application.
Figure 13:
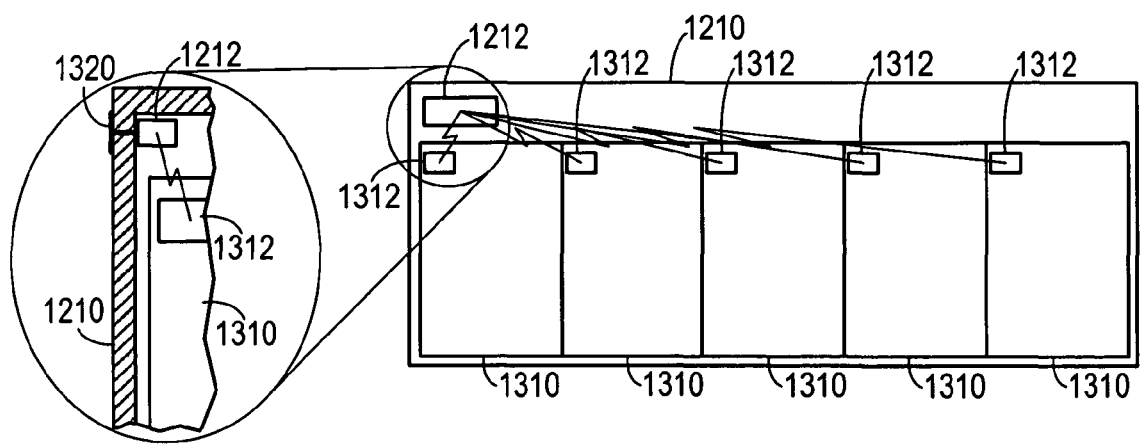
FIG. 13 is a schematic diagram and a detail of a shipping container.

As shown in FIG. 12, one embodiment of the invention can be used to monitor cargo containers 1210 in the cargo hold of a container ship 1200. Each container includes a mesh network communications device 1212 that includes a unique identification-storing memory. As shown in FIG. 13, in one embodiment, the mesh network communication device 1212 may be used to monitor the items 1310 inside the container 1210, wherein each item is fitted with its own mesh network communication device 1312. In one embodiment, the container mesh network communication device 1212 may be disposed inside the container 1210, with an antenna 1320 extending outside the container 1210 through an opening in the wall of the container 1210. In another embodiment, where only containers are tracked, the container mesh network communication device 1212 may be affixed to, and entirely disposed outside of the container 1210.

Figure 14:
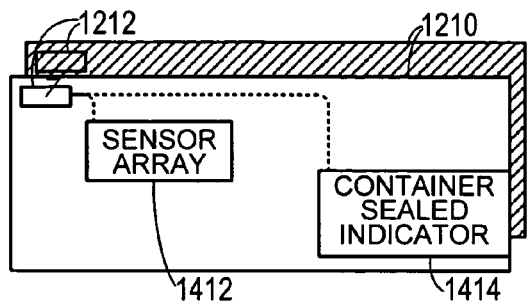
FIG. 14 is a schematic diagram of a sensor array embodiment employed in a container.
Figure 15:
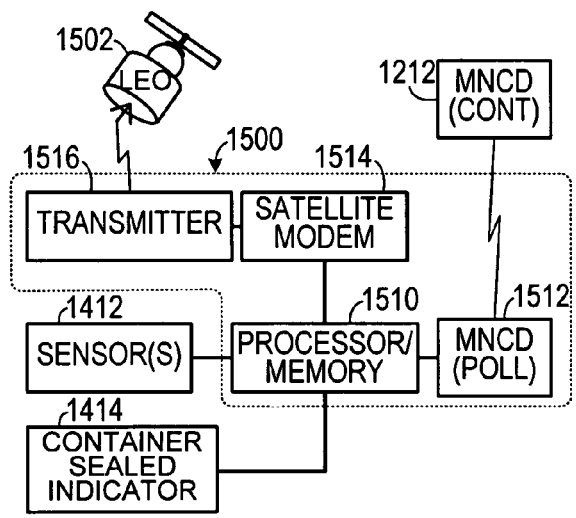
FIG. 15 is a block diagram of a sensor array embodiment.
Figure 16:
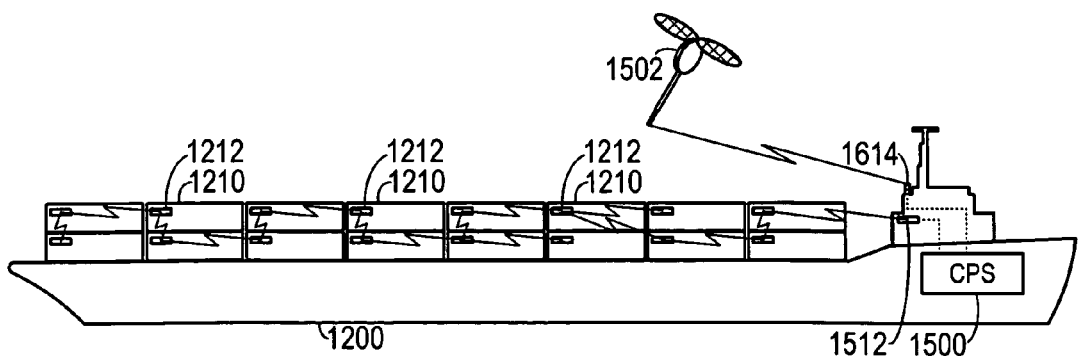
FIG. 16 is an elevational view of a cargo ship employing one embodiment.

As shown in FIGS. 14-16, one embodiment of the invention may be used to monitor the contents of a container 1210 to detect environmental conditions inside of the container 1210. Such an embodiment could be used to detect the presence of hazardous substances or to log temperatures in refrigerated containers to ensure that quality is maintained during transit. To accomplish these goals, a sensor array 1412 is coupled to the container mesh network communication device 1212. The sensor array could include one or more sensors, for example: radiation detectors, explosive detectors, chemical sensors, biological sensors, temperature sensors, pressure sensors, humidity sensors and the like. To ensure the integrity of the system, the door to the container 1210 could be fitted with a container access sensor 1414 that indicates whether the door has been opened or a seal (which could be applied once the container has been fully loaded) has been tampered with.

As shown in FIGS. 15-16, one embodiment communicates with a satellite 1502 (such as a low Earth orbiting satellite, for example a satellite whose services can be contracted through ORBCOMM, 21700 Atlantic Boulevard, Dulles, Va. 20166 USA). This embodiment includes a container polling unit 1500 that could be mounted on a container ship 1200. The container polling unit 1500 could include a processor 1510 that is in communication with the sensor array 1412 and the sealed container sensor 1414, and that communicates with a polling unit mesh network communication device 1512 and a satellite modem 1514, which in turn communicates with a satellite transmitter 1516. (It should be noted that the satellite modem 1514 and the satellite transmitter 1516 could be a single unit). One example of such a modem includes the Stellar ST2500, available from AirIQ Inc., 1099 Kingston Road Suite 233, Pickering, ON Canada L1V 1B5. The transmitter 1516 would be coupled to an antenna 1614 to facilitate communication with the satellite 1502. The polling mesh network communication device 1512 would communicate with one or more of the item-specific mesh network communications devices 1212 associated with the individual containers.

Figure 17:
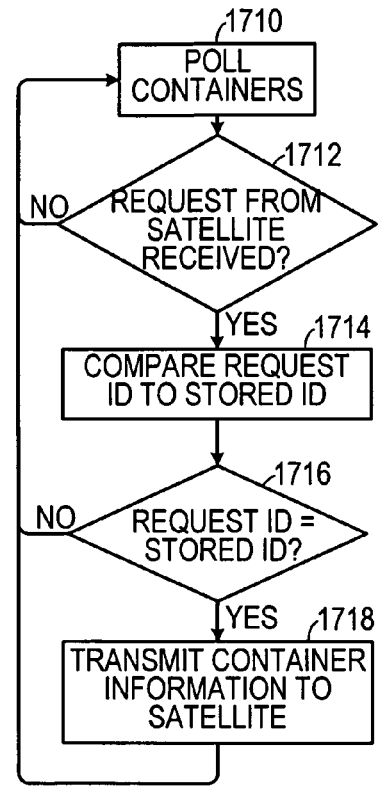
FIG. 17 is a flow chart that shows a polling routine.

In one method of operation, shown in FIG. 17, the container polling system 1500 would poll 1710 the containers 1210 periodically to receive information regarding the environmental conditions within each container 1210. When a request from an authorized satellite is received 1712, a received ship identification would be compared to a stored ship identification (stored in a memory associated with the processor 1510) and if they are determined to be the same 1716 then the container polling system 1500 would transmit 1718 some or all of the container information received in the polling step 1710 to the satellite.

The information could be processed by a remote receiver (having downloaded the information from the satellite) using known telematics technology techniques. In one embodiment, a report regarding the environment within any given container can be generated and transmitted to a user via a computer network, such as a global computer network. In one embodiment, the invention allows for near continuous tracking of a container and its contents during every stage of transport. A detailed report of the container's locations and the state of its internal environment may be generated. Such a report may be used to certify the container's contents and environment for both security purposes and quality control.

Figure 18:
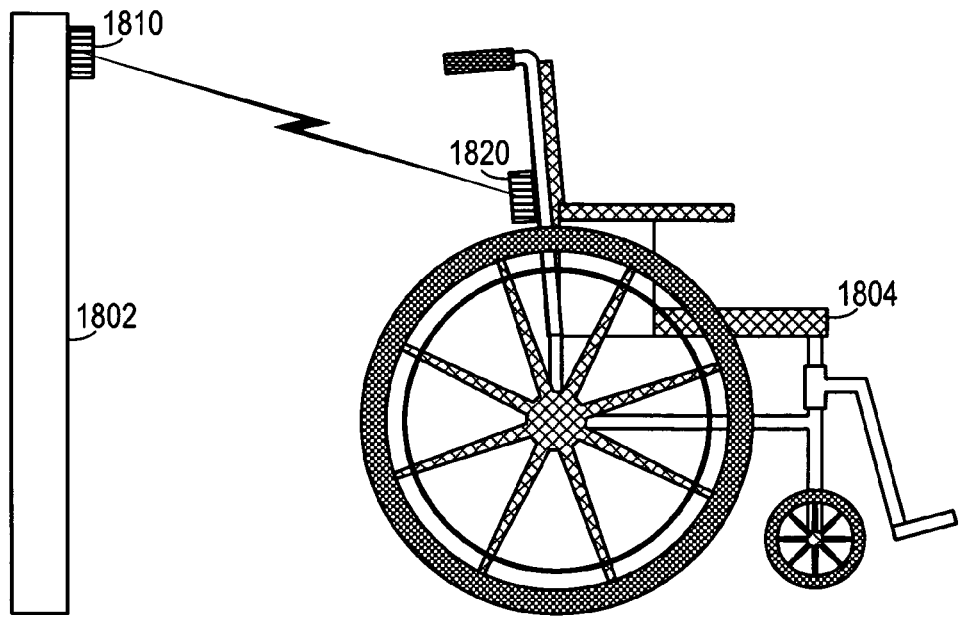
FIG. 18 is a schematic diagram of a mobile asset location system.

As shown in FIG. 18, a mobile asset 1804, such as a wheelchair or other personal mobility device, may be fitted with an asset-specific location device 1820 that is configured to communicate in a mesh network. The asset-specific location device 1820 may be attached to the mobile asset 1804 or embedded therein. The asset-specific location device 1820 communicates with a nearest fixed mesh network communications device 1810, which can be mounted, for example, on a wall 1802.

Figure 19:
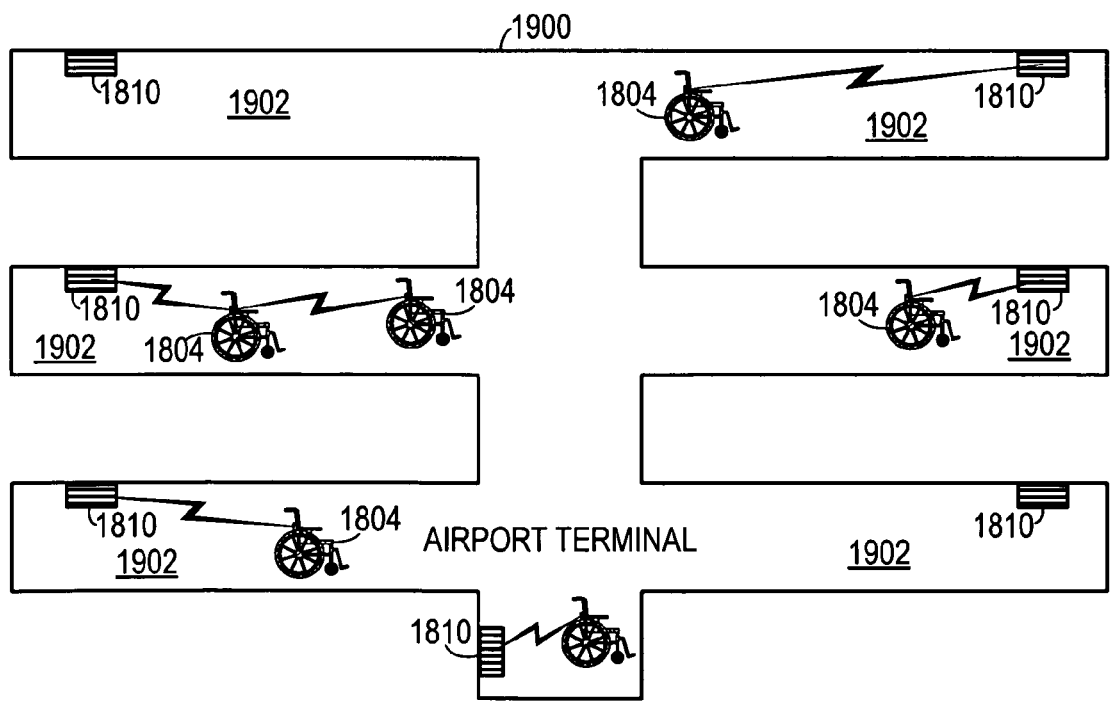
FIG. 19 is a schematic diagram of a mobile asset location system employed in an airport.

As shown in FIG. 19, this embodiment can be employed in an airport 1900 having several concourses 1902 wherein each concourse 1902 has at least one fixed mesh network communications device 1810 associated therewith. When a user wants to determine the locations of the mobile assets 1804, a request is sent from a central computer to each of the fixed mesh network communications devices 1810, which communicate the request to each of the asset-specific location devices 1820. Each of the asset-specific location devices 1820, send an identification to the nearest fixed mesh network communications device 1810, which then indicates to the central computer the concourse where each mobile asset 1804 may be found.

Figure 20:
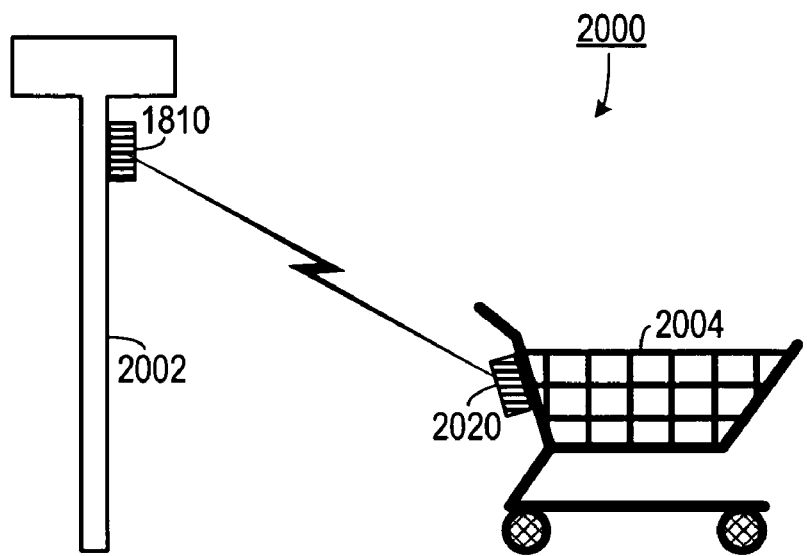
Figure 21:
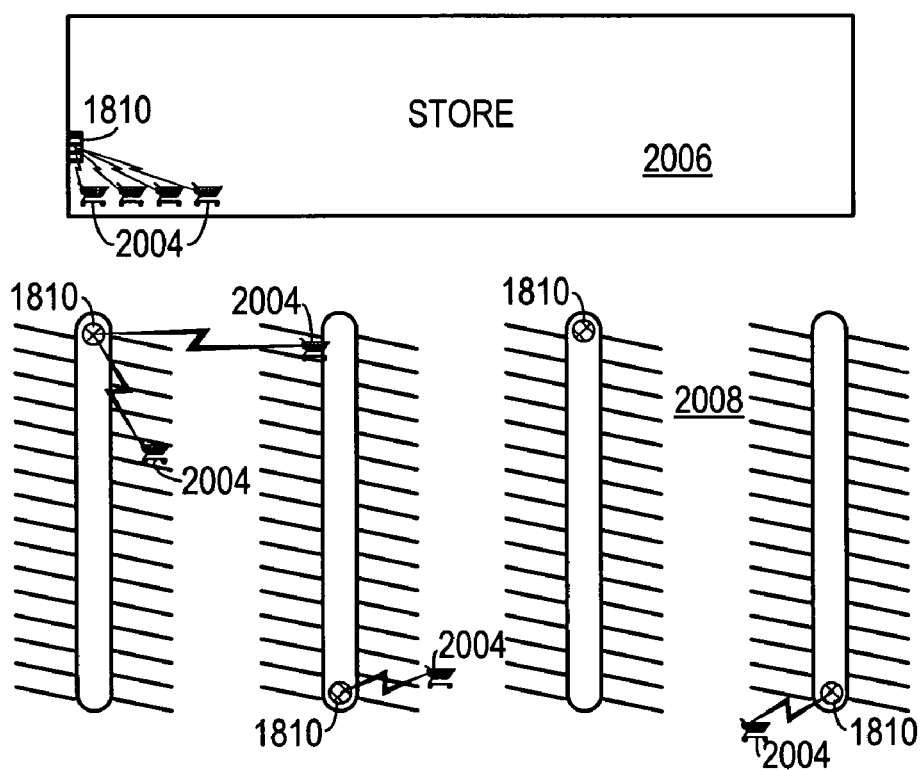
FIG. 21 is a schematic diagram of a mobile asset location system employed in a store and a surrounding parking lot.

As shown in FIGS. 20 and 21, the mobile asset 2004 can be a shopping cart that could be located in a store 2006 or in a parking lot 2008. The fixed mesh network communications devices 1810 could be disposed in the store 2006 and about the parking lot on, for example, light poles 2002.

In other examples, the mobile assets could include automobiles in a dealership lot. The mobile assets could include bicycles (such as rental bicycles), in a city with fixed mesh network communications device disposed around the city to keep track of the bicycle locations. Other examples of mobile assets include forklifts and flat and mobile carts of the type used in large hardware stores. It is intended that all of these embodiments fall within the scope of the invention.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A system for locating mobile assets within a predefined area, comprising:
   a. a plurality of fixed mesh network communications devices each associated with a different predetermined location within the predefined area;
   b. an asset-specific location device coupled to at least one of the mobile assets and configured to communicate an asset-specific identification to a nearest one of the plurality of fixed mesh network communications devices via a mesh network; and
   c. a computer, in communication with each of the fixed mesh network communications devices, that is configured to:
      i. receive from a user a request for a location of a selected one of the mobile assets;
      ii. poll each of the plurality of fixed mesh network communications devices to determine which one of the plurality of fixed mesh network communications devices is in communication with a selected asset-specific location device that is in affixed to the selected one of the mobile assets; and
      iii. identify to the user the predetermined location associated with the fixed mesh network communications device that is in communication with the selected asset-specific location device.

2. The system of claim 1, wherein each of the plurality of fixed mesh network communications devices each comprise:
   a. a power source;
   b. a mesh network communication device electrically coupled to the power source; and
   c. a memory that stores a fixed mesh network communications device identification.

3. The system of claim 1, wherein the asset-specific location device comprises:
   a. a power source;
   b. a mesh network communication device electrically coupled to the power source;
   c. a memory circuit that stores the asset-specific identification; and
   d. a processor, electrically coupled to the power source, in communication with the memory circuit and the mesh network communication device, the processor programmed to execute the following steps:
      i. if an asset identification message is received from the fixed mesh network communication device, then compare an asset identification included in the asset identification message to the asset-specific identification stored in the memory; and
      ii. when the asset identification included in the asset identification message corresponds to the asset-specific identification stored in the memory, then transmit an asset found message to the fixed mesh network communication device.

4. The system of claim 1, wherein the asset-specific location device is embedded in the at least one of the mobile assets.

5. The system of claim 1, wherein the asset-specific location device is affixed to the at least one of the mobile assets.

6. The system of claim 1, wherein the mobile assets comprise personal mobility devices and wherein the predefined area comprises an airport.

7. The system of claim 1, wherein the mobile assets comprise shopping carts and wherein the predefined area comprises a parking lot.

8. A system for locating mobile assets within an airport, comprising:
   a. a plurality of fixed mesh network communications devices each disposed in a different area of the airport;
   b. a wheel chair that is coupled to a wheel chair-specific location device, wherein the wheel chair-specific location device is configured to communicate a wheel chair-specific identification to a nearest one of the plurality of fixed mesh network communications devices via a mesh network, each wheel chair-specific location device including:
      i. a power source;
      ii. a mesh network communication device electrically coupled to the power source;
      iii. a memory circuit that stores the wheel chair-specific identification; and iv. a processor, electrically coupled to the power source, in communication with the memory circuit and the mesh network communication device, the processor programmed to execute the following steps:
  (1) if a wheel chair identification message is received from the fixed mesh network communication device, then compare a wheel chair identification included in the wheel chair identification message to the wheel chair-specific identification stored in the memory; and
  (2) when the wheel chair identification included in the wheel chair identification message corresponds to the wheel chair-specific identification stored in the memory, then transmit a wheel chair found message to the fixed mesh network communication device; and
c. a computer, in communication with each of the fixed mesh network communications devices that is configured to:
  i. receive from a user a request for a location of a selected wheel chair;
  ii. poll each of the plurality of fixed mesh network communications devices to determine which of the plurality of fixed mesh network communications devices is in communication with a selected wheel chair-specific location device that is in affixed to the selected one of the wheel chairs; and
  iii. identify to the user the predetermined location associated with the fixed mesh network communications device that is in communication with the selected wheel chair-specific location device.

9. The system of claim 8, wherein each of the plurality of fixed mesh network communications devices each comprise:
a. a power source;
b. a mesh network communication device electrically coupled to the power source; and
c. a memory that stores a fixed mesh network communications device identification.

10. A system for locating assets in a parking lot, comprising:
a. a plurality of fixed mesh network communications devices each disposed in a different area of the parking lot;
b. a shopping cart that is coupled to a shopping cart-specific location device, wherein the shopping cart-specific location device is configured to communicate a shopping cart-specific identification to a nearest one of the plurality of fixed mesh network communications devices via a mesh network, each shopping cart-specific location device including:
  i. a power source;
  ii. a mesh network communication device electrically coupled to the power source;
  iii. a memory circuit that stores the shopping cart-specific identification; and
  iv. a processor, electrically coupled to the power source, in communication with the memory circuit and the mesh network communication device, the processor programmed to execute the following steps:
    (1) if a shopping cart identification message is received from the fixed mesh network communication device, then compare a shopping cart identification included in the shopping cart identification message to the shopping cart-specific identification stored in the memory; and
    (2) when the shopping cart identification included in the shopping cart identification message corresponds to the shopping cart-specific identification stored in the memory, then transmit a shopping cart found message to the fixed mesh network communication device; and
c. a computer, in communication with each of the fixed mesh network communications devices that is configured to:
  i. receive from a user a request for a location of a selected wheel chair;
  ii. poll each of the plurality of fixed mesh network communications devices to determine which of the plurality of fixed mesh network communications devices is in communication with a selected wheel chair-specific location device that is in affixed to the selected one of the shopping carts; and
  iii. identify to the user the predetermined location associated with the fixed mesh network communications device that is in communication with the selected shopping cart-specific location device.

11. The system of claim 10, wherein each of the plurality of fixed mesh network communications devices each comprise:
a. a power source;
b. a mesh network communication device electrically coupled to the power source; and
c. a memory that stores a fixed mesh network communications device identification.

12. A method of locating mobile assets within a predefined area, comprising the actions of:
a. transmitting from a central station an asset identification to a plurality of fixed mesh network communications devices associated with a different predetermined location within the predefined area;
b. transmitting the asset identification from each fixed mesh network communications device;
c. receiving a response, at one fixed mesh network communication device, from at least one asset-specific location device affixed to at least one of the mobile assets that indicates that the at least one asset-specific location device has stored therein the asset identification; and
d. transmitting from the one fixed mesh network communication device to the central station an indication that the one fixed mesh network communication device has received the asset identification from the at least one asset-specific location device.

13. The method of claim 12, wherein the central station comprises a computer in communication with each of the fixed mesh network communications devices.

14. The method of claim 13, wherein the computer is programmed to indicate to a user a location of the mobile asset based on an identification of the fixed mesh network communication device that transmitted the indication.

* * * * *